Sept. 13, 1966   R. D. RUTT ETAL   3,271,909
GRINDING APPARATUS

Filed March 13, 1964   2 Sheets-Sheet 1

INVENTORS
RICHARD D. RUTT
ADOLPH C. CARLSON

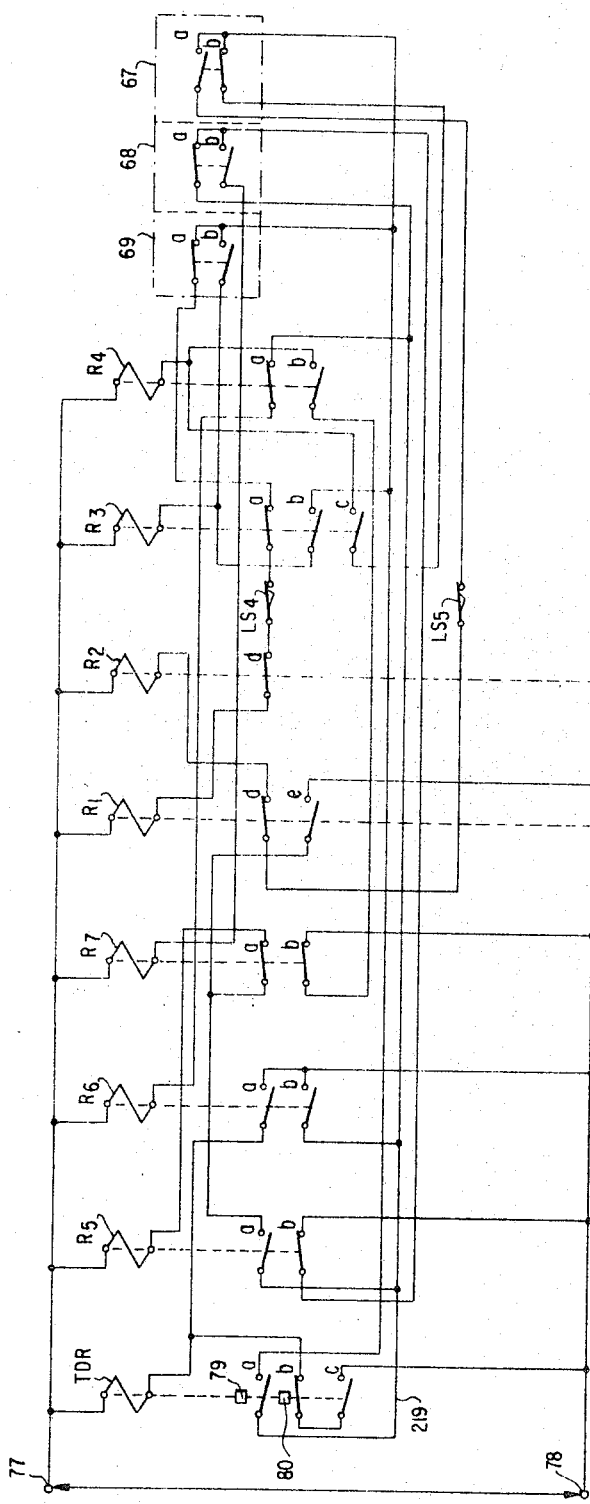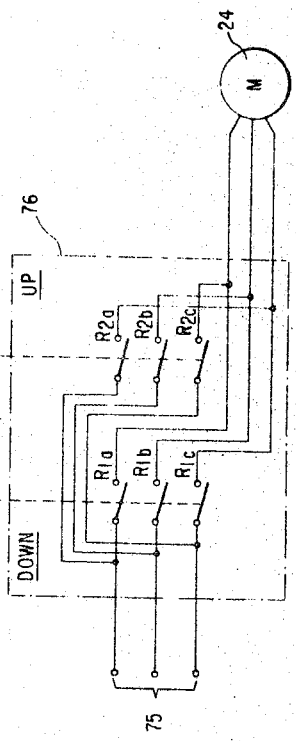

3,271,909
GRINDING APPARATUS
Richard D. Rutt, Wilson, and Adolph C. Carlson, Grand Island, N.Y., assignors to The Carborundum Company, Niagara Falls, N.Y., a corporation of Delaware
Filed Mar. 13, 1964, Ser. No. 351,692
11 Claims. (Cl. 51—165)

This invention relates to improvements in grinding apparatus and more particularly to machines for grinding workpieces having generally planar surfaces.

In performing certain grinding operations such as finish grinding of large numbers of flat workpieces in sequence, the lack of complete dimensional uniformity which is inherent in any unfinished work product gives rise to certain variables which tend to slow the rate at which the grinding processes can be performed. Each piece may vary in thickness, in dimensional profile, or in both. The extent to which a workpiece differs from the preceding workpiece in thickness or the extent to which it varies in thickness along one of its dimensions may require certain adjustments to be made in the grinding apparatus.

If such adjustments were not made in the grinding equipment the efficiency and uniformity of the grinding operation could suffer. For example, if the machine settings result in insufficient depth of cut by the grinder, the task of completing the process would be unduly prolonged. On the other hand, if the depth of cut is too great, substantial damage to the grinding machine or to the workpiece may result.

In the finish grinding of planar surfaces, for example, it is often desirable for the grinding apparatus to remove material from the surface of the workpiece down to a fixed level below the original surface. A constant depth of cut is especially important in those grinding operations intended to produce uniform work products in substantial quantities.

It is an object of this invention to provide a grinding apparatus which responds to the thickness of a workpiece to initiate and maintain a preselected depth of cut.

A still further object of the invention is the provision of an improved grinding machine which senses variations in the thickness of successive workpieces fed into the machine and adjusts itself automatically to initiate the proper cutting rate on each workpiece in sequence.

By way of a brief summary of a preferred embodiment of the invention, a grinding apparatus is provided in which a grinding head is mounted at a fixed location above a worktable and in which flat slabs of material are transported across the table and under the grinding head to be contacted by a driven grinding surface for a surface abrading operation. The worktable supporting the workpieces is provided with an elevator drive mechanism for controllably raising and lowering the worktable thereby to vary its vertical distance from the overhanging grinding head. A thickness gauge positioned on the grinding machine senses the thickness of the workpieces moving over the table toward the grinding head. This thickness gauge includes an elongated plunger mounted for vertical reciprocating movement in a bracket and having at its lower end a feeler member to be contacted by the upper surfaces of workpieces approaching the grinding head and to be positioned vertically thereby. Microswitches mounted on the bracket sense the position of the shaft. These switches operate respective relays controlling the elevator mechanism for the worktable to position the top of the incoming workpiece properly with respect to the grinding head as it approaches the head. If the upper surface of the incoming workpiece is positioned too high or too low, the microswitches associated with the thickness gauge are actuated to energize the elevator motor for the workable either to lower it or to raise it toward the grinding head until the upper surface of the workpiece is positioned at the proper height for initiation of the grinding operation.

Although the scope of this invention is not to be limited except by the appended claims, further details of the invention as well as additional objects and advantages will be more clearly perceived in connection with the following more complete description taken together with the accompanying drawings in which:

FIG. 3 is a circuit diagram of the elevator control circuit.

Figure 1:
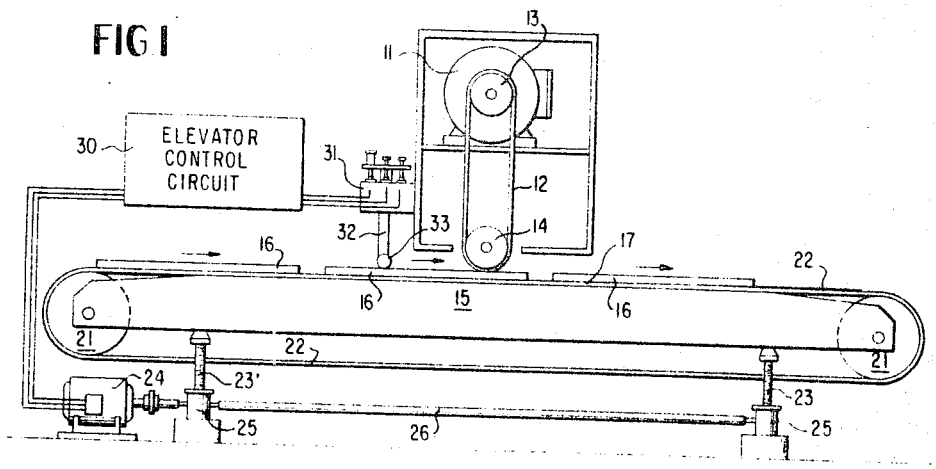
FIG. 1 is a diagrammatic side view of a grinding apparatus embodying the present invention.

In the grinding system illustrated in FIG. 1, a grinding head 10 is shown enclosing an electric motor 11. The motor drives an abrasive surfaced belt 12 looped about a drum 13 attached to the shaft of the motor and an additional drum 14 spaced below the motor and mounted on the grinding head 10. The grinding system includes a worktable 15 for supporting workpieces 16 and for transporting these workpieces across an upper surface of the worktable into contact with the abrasive surface of the grinding belt 12. For this purpose the worktable 15 includes a polished upper surface 17 and at either end of the worktable enlarged rollers 21, at least one of which is power driven. A dense rubberlike belt 22 is stretched around the end rollers 21 and is in sliding contact with the upper surface 17 of the worktable 15. This belt carries the workpieces 16 into positions beneath the grinding head 10 so that the upper surfaces of the workpieces may be abraded.

To accommodate workpieces of varying thickness and to insure that such workpieces are brought into contact with the abrading surface at the correct elevation, the worktable 15 is mounted for vertical adjustment on a plurality of jack screws 23 for the purpose of raising and lowering the worktable relative to the grinding head. A reversible drive motor 24 is connected to drive the jack screws 23 through gear boxes 25. The gear boxes 25 are joined by a connecting drive shaft 26 to insure that both jack screws 23 are driven simultaneously and in the same amounts, thereby to keep the worktable 15 level at all times. It is to be understood, therefore, that the electric motor 24 together with the jack screws 23 and the cooperating linkages and gearing constitute a reversible drive elevator mechanism which is capable of adjusting the vertical position of the entire worktable. With such an elevator mechanism, the worktable may be raised to permit the grinding head to operate upon thin workpieces and lowered to accommodate thicker workpieces.

The elevator mechanism is under the control of the elevator control circuit 30 governed by a thickness gauge 31 mounted on the forward side of the grinding head 10. The thickness gauge comprises a feeler member 32 capable of vertical reciprocation and having a roller 33 at its lower end in a position to engage the workpieces and to ride upon the upper surfaces of the workpieces to be positioned vertically thereby. As will be seen more clearly in connection with succeeding illustrations, the vertical position of the feeler member 32 governs the operation of certain microswitches included within the thickness gauge 31 to cause the elevator control circuit to lower the worktable 15 or to raise it to a position providing a correct elevation for incoming workpieces approaching the abrasive surface of the grinding head.

The grinding system, thus generally described, automatically adjusts to compensate for variations in average thickness between successive workpieces. By automatically and inherently correcting in this manner for variations in workpieces, the grinding system possesses the capability of operating continuously and at high speed upon a large number of workpieces sequentially despite substantial variations in workpieces which might otherwise delay the speed at which the surfacing operations could be performed or result in non-uniform work products.

Figure 2:
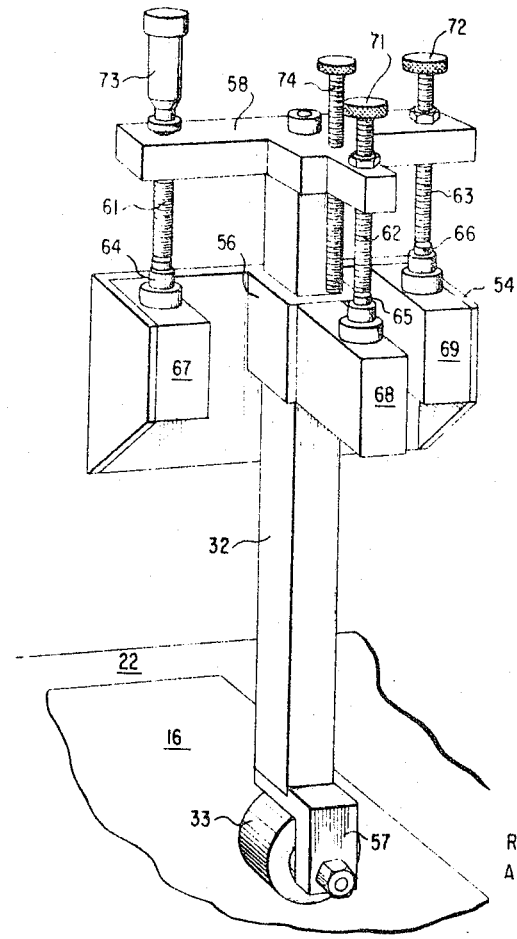
FIG. 2 is an enlarged perspective view of the feeler gauge shown attached to the assembly of FIG. 1.

Turning now to FIG. 2, there may be seen in greater detail the structure and organization of the thickness gauge which governs the operation of the elevator control circuit. The gauge comprises a bracket 54 for affixation to the side of the grinder head from which the workpieces approach the abrasive surface. The feeler member 32 in the form of an elongated plunger is mounted for sliding vertical movement within a collar 56 of the bracket 54. At the lower end of the feeler member 32 an offset extension 57 supports the roller 33. This roller rides on the upper surface of each workpiece 16 and positions the feeler member 32 at an elevation dependent upon the height of the aforesaid workpiece surface. At the upper end of the vertically positionable member 32 and mounted thereon is a perpendicular plate 58 forming with the feeler member 32 a generally T-shaped assembly. In this embodiment a group of adjustable actuators 61, 62 and 63 are threaded into the plate 58 for cooperation at their lower ends with actuating buttons 64, 65 and 66 of three snap switches 67, 68 and 69 of the so-called microswitch variety. These switches 67–69 are mounted in fixed positions and are actuated by vertical movements of the actuators 61–63. It is these switches which, in responding to the position of the feeler member 32, govern the operation of the elevator control circuit to raise or lower the worktable associated with the grinding system.

Actuating members 62 and 63 are provided with knurled knobs 71 and 72 for vertical adjustment of these members. For precision adjustments to control the operation of the switch 67 within more closely controlled limits, a micrometer adjustment assembly 73 is provided at the top of the actuating member 61. The micrometer assembly 73 may be calibrated numerically for selecting the precise depth of a grinding operation according to the type of finish required, the amount of material to be removed from the workpiece, the nature of the workpiece material, and the grit size of the grinding belt. An adjustable stop member 74 is threaded into plate 58 for abutment at its lower end against a portion of bracket 54 to prevent the microswitches 67, 68 and 69 from assuming the full weight of the feeler member between the workpieces.

In FIG. 3 there may be seen a circuit diagram of the elevator control circuit which responds to the condition of the switches 67, 68 and 69 of the thickness gauge to control the drive motor 24 of the elevator mechanism. In general, the circuit operates in the following fashion: Between workpieces the elevator drive mechanism is raised to its uppermost limit. When a succeeding workpiece engages the feeler member of the thickness gauge and rides upon the workpiece, the consequent actuation of the contacts of the switch 68 conditions the circuit and permits the switch 69 to energize the motor 24 and to drive it in a direction to lower the worktable. At a certain point in its downward travel, the worktable reverses the conditions of the switches of 69 and 67 and results in the drive motor 24 being reverse-actuated to begin raising the worktable. Ultimately the worktable, in raising, trips the contacts of switch 67 which, it will be recalled, is very precisely adjusted by its associated micrometer assembly 73. Under such conditions, the final movement of the worktable is always upward, and the worktable is therefore arrested always at the precise point which positions the upper surface of the workpiece properly for its approach to the grinding head.

By convention in FIG. 3 the contacts of each of the relays R1 through R7 are identified by the same letter and number designation applied to their respective operating windings but with letter suffixes added thereto. All switches are shown in their unactuated or normal condition. The elevator drive motor 24 is energized, in this embodiment of this invention, from a three-phase power source represented by input terminals 75, the power being supplied selectively through either of two sets of contacts included within the block outline 76. Contacts R1a, R1b, and R1c, when picked up by the energization of the R1 contactor winding, drive the motor 24 in the DOWN direction to lower the worktable. Contacts R2a, R2b and R2c, when operated by the winding R2, drive the motor in a reverse or UP direction to raise the worktable. The energization of relays R1 and R2 as well as the other relays shown in FIG. 3 is accomplished by completing a circuit through the relay windings across the input terminals 77 and 78 which are connected to receive operating potentials from the same power source connected with the terminals 74.

Contacts 69a, it can be seen, are in series circuit with relay winding R1, the DOWN relay, through contacts R2d, LS4 and R3a. Consequently, the contacts 69a control the lowering of the elevator mechanism. Contacts 67a, on the other hand, are in series with the winding of operating relay R2, the UP relay, through contacts R1d and LS5 to control the raising of the elevator mechanism. Switches LS4 and LS5 are respective limit switches which may be operated by movements of the worktable itself to open the DOWN and UP relay circuits and prevent the worktable from being raised or lowered beyond permissible limits. Normally the contacts LS4 and LS5 are closed as shown in this illustration.

As a new workpiece approaches the grinding head it passes under the limit switch actuator roller 33 and lifts the reciprocating plunger 32. The switch actuating members 61, 62 and 63 are therefore raised away from the limit switches 67, 68 and 69 to cause the limit switches to assume their normal contact conditions shown in FIG. 3, there being no actuation force against them. When the limit switch 68 is in this condition its contacts 68a are normally closed completing a circuit through the normally closed contacts R5b and R4a to energize the winding of relay R6. The normally open contacts R6b therefore close to latch in the relay R6 as long as the normally closed contacts R4a in series with the winding of relay R6 remain closed. Simultaneously the normally open contacts R6a close to energize the winding of the time delay relay TDR.

The time delay relay TDR has associated with it three sets of differently actuated contacts. Normally open contacts TDRa and normally closed contacts TDRb are delayed in their actuation by a delay mechanism represented diagrammatically by dashpots 79 and 80, respectively. Normally open contacts TDRc are closed instantaneously, however, upon energization of the winding of the relay TDR. As a result, the energization of the winding of relay TDR instantly closes contacts TDRc to complete a holding circuit through the winding of the relay TDR until contacts TDRb open.

At the end of a time delay period selected to permit the roller 33 to reach the upper surface of the workpiece, contacts TDRa open, but the winding of relay TDR remains energized because of the now-closed contacts R6a. As contacts TDRa open, the associated contacts TDRb close to energize the winding of relay R1 through normally closed contacts R3a and 69a, both of which are in series with the winding of relay R1. Energizing the winding of relay R1 closes the normally open contacts R1a, R1b and R1c to drive the elevator motor 24 in a DOWN direction thereby lowering the worktable away from the abrasive surface.

As the worktable lowers, the plunger 32 of the thickness gauge also lowers since the roller 33 at its lower end rests on the workpiece and travels vertically with it. All the while, of course, the workpiece continues to travel horizontally beneath the grinding head toward contact with the abrasive surface. As the worktable moves downward switch 67 is the first to be actuated. The closing of contacts 67a would otherwise result in the energization of relay R2 except for the fact that relay winding R1, being still energized, holds contacts R1d open and prevents the energization of the winding of relay R2.

When the winding of the DOWN relay R1 is energized, its contacts R1e close to energize the winding of relay R5 through normally closed contacts R7a. The relay R5 latches itself in the energized state by completing a circuit through its contacts R5a and through the normally closed contacts R7a. In such a state, therefore, the normally closed contacts R5b are open.

The worktable 15 therefore continues its downward travel until actuator 63 actuates the switch 69 and reverses the condition of its contacts. It should be recalled that at this point in the operation of the system contacts 67a are closed. Thus, as soon as contacts 69a open to interrupt the circuit through the coil of relay R1, the normally closed contacts R1d reclose and complete an energization circuit through the winding of relay R2 and through contacts 67a. Therefore, as contacts R1a, R1b and R1c open, the reverse drive contacts R2a, R2b and R2c close thereby driving the elevator motor in an UP direction raising the worktable.

Concomitantly, the normally open contacts 69b close to energize the winding of relay R3 which, in closing its normally open contacts R3b completes a holding circuit for relay R3. Also, the normally closed contacts R3a open thereby preventing the possibility that a circuit could be completed through the R1 relay winding and through the switch contacts 69a. In being energized relay R3 also closes contacts R3c. The worktable continues to move upward, therefore, until a reverse actuation of switch 67 takes place returning contacts 67a to their normally open condition. Thereupon the circuit through the operating winding of relay R2 opens and contacts R2a, R2b, and R2c open to stop the worktable at its final elevation. The final elevation, it is to be recalled, is accurately controlled by the micrometer adjustment assembly 73 which cooperates with switch 67.

When the worktable has reached its final position, contacts 67b close to energize the winding of relay R4 through the already closed contacts R3c. Upon energization of relay R4 contacts R4a open interrupting the energization of the winding of relay R6. Contacts R6a therefore open to deenergize the time delay relay TDR. This action resets the timing cycle.

It is to be noted that the normally open contacts TDRa are in circuit with the contacts 67a and also with the contacts 69a to prevent the actuation of the latter contacts from bringing about the raising or lowering of the worktable until a predetermined period of time has elapsed. This period of time is selected to be sufficient for a workpiece to travel completely under roller 33 before the position of the worktable is adjusted.

When the system is in its finally adjusted condition, it is incapable of further electrically actuated mechanical motion of the elevator mechanism until the workpiece has passed the thickness gauge. The secondary contacts 67b, 68b and 69b associated with the thickness gauge condition the circuit such that once the system has adjusted itself to the thickness of a workpiece, the system will not recycle as the result of minor irregularities which may occur on the surface of the workpiece. Only after a workpiece passes the thickness gauge and the plunger 32 drops a substantial distance will the system reset itself.

If the next succeeding workpiece is of the same size as the preceding one, the system will take no further corrective action. If the workpiece is substantially thinner than the preceding workpiece, switch 68 will be actuated but neither switch 67 or switch 69 will have been restored to their normal condition. Contacts 67a therefore, being closed, energize the winding of relay R2 to raise the worktable toward its final position without first lowering the worktable. The workpiece is therefore always brought to its final position from the same direction whether the corrective adjustment requires the worktable to be raised or lowered by a measured increment.

It can be seen, therefore that the grinding system shown and described adjusts automatically to variations in thickness of successive workpieces to remove a portion of the surface material down to a preselected level. As a consequence, the grinding operations performed on successive workpieces are substantially uniform despite variations in thickness which may occur between successive workpieces.

In those cases where the guiding factor in the grinding operation is the grinding of workpieces to the same final thickness, and where the workpieces of a group to be surfaced are not grossly disproportioned, it may be desirable for the elevator control mechanism to be actuated in response to the thickness of the first workpiece and to be maintained at the setting for a number of successive workpieces. Thus the grinding system might adjust itself to groups of workpieces rather than to each workpiece singly.

Consequently, although the above description and the accompanying drawings disclose but a single embodiment of the invention, and although specific language has been employed in describing the several figures, it should be understood that the preferred embodiment illustrated and described is intended to be illustrative of the nature of the invention and not necessarily limiting upon its scope. Certain variations and modifications will doubtless occur to those skilled in the art to which the invention pertains. The following claims are therefore intended to cover all such variations and modifications as fall within the true scope and spirit of the invention in its broader aspects.

What is claimed is:

1. A grinding apparatus comprising:
a grinding head having a driven abrasive surface;
a worktable spaced beneath said grinding head to support workpieces for treatment by said abrasive surface;
an elevator mechanism for adjusting the relative vertical positions between the worktable and said abrasive surface;
means for sensing the vertical position of the upper surface of a workpiece placed on said worktable; and
control means operatively connected to said elevator mechanism and responsive to said sensing means for adjusting the relative vertical distance between said worktable and said abrasive surface to effect removal of material by said abrasive surface from the upper surface of the workpiece down to a fixed level below the upper surface thereof.

2. A grinding apparatus comprising:
a grinding head having a driven abrasive surface;
a worktable spaced beneath said grinding head to support workpieces for treatment by said abrasive surface;
an elevator mechanism for adjusting the relative vertical positions of said worktable and said abrasive surface;
means for sensing the vertical position relative to said abrasive surface of the upper surface of a workpiece placed on said worktable; and
control means operatively connected to said elevator mechanism and responsive to said sensing means for establishing a vertical relationship between said abrasive surface and the upper surface of said workpiece to effect removal of material by said abrasive surface from the upper surface of the workpiece a fixed vertical distance from said upper surface.

3. A grinding apparatus comprising:
a grinding head having a driven abrasive surface;
a worktable spaced beneath said grinding head to support workpieces for treatment by said abrasive surface;
an elevator mechanism for adjusting the relative vertical distance between said worktable and said abrasive surface;

means for sensing the vertical position relative to said abrasive surface of an upper surface of a workpiece placed upon said worktable; and control means responsive to said sensing means for actuating said elevator mechanism to adjust the relative positions between the worktable and said abrasive surface by an amount proportional to and in an opposite direction from the departure of the upper surface of such workpiece and said abrasive surface from a predetermined displacement so that said abrasive surface is positioned relative to the upper surface of such workpiece to effect a fixed depth of cut into such upper surface.

4. A grinding apparatus comprising:

a grinding head having a driven abrasive surface;

a worktable spaced beneath said grinding head to support workpieces for treatment by said abrasive surface;

an elevator mechanism for adjusting the vertical position of said worktable;

means for sensing the vertical position of an upper surface of a workpiece placed upon said worktable; and control means responsive to said sensing means for actuating said elevator mechanism to adjust the vertical position of said worktable by an amount proportional to and in a direction opposite from the displacement of the upper surface of such workpiece from a predetermined elevation in order to effect a fixed depth of cut into the upper surface of said workpiece by said abrasive surface.

5. A grinding apparatus comprising:

a grinding head having a driven abrasive surface;

a worktable spaced beneath said grinding head to support workpieces for treatment by said abrasive surface;

an elevator mechanism for adjusting the relative vertical positions of said worktable and said abrasive surface;

means for sensing the vertical position relative to said abrasive surface of the upper surface of a workpiece placed on said worktable; and control means operatively connected to said elevator mechanism for establishing a vertical relationship between said abrasive surface and the upper surface of said workpiece to effect removal of material by said abrasive surface from the upper surface of the workpiece a fixed vertical distance from said upper surface, the final adjustments of said relative vertical positions being made always from the same direction.

6. A grinding apparatus comprising:

a grinding head having a driven abrasive surface;

a worktable spaced beneath said grinding head to support workpieces for treatment by said abrasive surface;

means for moving workpieces across said worktable toward engagement with said abrasive surface;

an elevator mechanism for adjusting the relative vertical positions between the worktable and said abrasive surface;

means for sensing the vertical position relative to said abrasive surface of the upper surface of a workpiece placed on said worktable and approaching said abrasive surface; and control means responsive to said sensing means for actuating said elevator means to adjust the relative vertical positions between said worktable and said abrasive surface to enable removal of material by said abrasive surface from said upper surface of said workpiece a fixed vertical distance from said upper surface;

said control means including time delay means for delaying the actuation of said elevator mechanism a sufficient period of time to permit said sensing means to adjust to such upper surface of such workpiece.

7. An apparatus for grinding generally planar surfaces of work pieces comprising:

a grinding head having a driven abrasive surface;

a horizontal worktable spaced beneath said grinding head including means for transporting workpieces across an upper surface of said worktable and into contact with said abrasive surface;

a reversible drive elevator mechanism for adjusting the relative vertical positions between the aforesaid upper surface of said worktable and said abrasive surface;

a thickness gauge mounted in a fixed position relative to said grinding head and having a movable member located to contact the uppermost surfaces of workpieces placed upon the aforesaid upper surface of said worktable and approaching said grinding head, said movable member being positioned vertically by contact with the uppermost surfaces of such workpieces, said thickness gauge having a plurality of electrical switches selectively actuated in response to vertical movements of said movable member; and an elevator control circuit responsive to the condition of the switches in said thickness gauge for controlling said elevator mechanism, said elevator control circuit operating to decrease the distance between said worktable and said abrasive surface when the upper surface of a workpiece contacted by the movable member of said thickness gauge is below a predetermined height relative to said grinding head and to increase the distance between said worktable and said grinding head when the upper surface of a workpiece contacted by the movable member of said thickness gauge is above said predetermined height relative to said grinding head, whereby the relative positions between said abrasive surface and the upper surfaces of all workpieces approaching said abrasive surface are automatically caused to assume a predetermined vertical relationship prior to the initiation of an abrading operation on such workpieces.

8. An apparatus for grinding generally planar surfaces of workpieces comprising:

a grinding head having a driven abrasive surface;

a horizontal worktable spaced beneath said grinding head including means for transporting workpieces across an upper surface of said worktable and into contact with said abrasive surface;

a reversible drive elevator mechanism for adjusting the relative vertical positions between the aforesaid upper surface of said worktable and said abrasive surface;

a thickness gauge mounted over said worktable in a fixed position relative to said grinding head, and having a vertically movable member located to contact the uppermost surfaces of workpieces placed upon the aforesaid upper surface of said worktable and approaching said grinding head, said movable member being positioned vertically by contact with the uppermost surfaces of said workpieces, said thickness gauge having a plurality of electrical switches selectively actuated in response to vertical movements of said movable member, one of said switches being actuated when said movable member is raised above a predetermined vertical position relative to said grinding head and another of said switches being actuated when said movable member drops below said predetermined position relative to said grinding head; and an elevator control system responsive to the condition of the switches in said thickness gauge for controlling said elevator mechanism, said elevator control circuit operating to increase the distance between said worktable and said abrasive surface in response to the actuation of said one switch and to decrease the distance between said worktable and said grinding head in response to the actuation of said other switch, whereby the relative positions between said abrasive surface and the upper surfaces of all workpieces approaching said abrasive surface are automatically caused to assume a predetermined vertical relationship prior to the initiation of an abrading operation on such workpieces.

9. A grinding apparatus comprising:

a stationary grinding head having a driven abrasive surface;

a horizontal worktable beneath said grinding head including means for transporting workpieces across an upper surface of said worktable and into contact with said abrasive surface;

a reversible drive elevator mechanism supporting said worktable for adjusting the vertical position of said worktable;

a thickness gauge mounted adjacent said grinding head and having a movable member located to contact the upper surface of workpieces approaching said grinding head and to be positioned vertically by contact therewith, said thickness gauge having a plurality of electrical switches selectively actuated in response to vertical movements of said movable member; and an elevator control circuit responsive to the condition of the switches in said thickness gauge for controlling said elevator mechanism, said elevator control circuit causing said elevator mechanism to raise said worktable when the upper surface of a workpiece contacted by the movable member of said thickness gauge is below a predetermined height and to lower said worktable when the upper surface of such a workpiece is above said predetermined height, whereby the upper surfaces of all such workpieces approaching said abrasive surface are caused to be positioned at said predetermined height.

10. A grinding apparatus comprising:

a grinding head having a driven abrasive surface;

a worktable spaced beneath said grinding head to support workpieces for treatment by said abrasive surface;

an elevator mechanism for adjusting the relative vertical distance between said worktable and said abrasive surface;

means for sensing the vertical distance between said abrasive surface and the upper surface of a workpiece placed upon said worktable; and control means responsive to said sensing means for actuating said elevator mechanism to adjust the relative positions between the worktable and said abrasive surface to result in a predetermined vertical displacement therebetween, said control means operating when the vertical distance between said surfaces exceeds said displacement to narrow said vertical distance until it equals said displacement and operating when the vertical distance between said surfaces is less than said displacement first to widen said vertical distance until it exceeds said displacement and then to narrow said vertical distance until it equals said displacement.

11. A grinding apparatus comprising:

a grinding head having a driven abrasive surface;

a worktable spaced beneath said grinding head to support workpieces for treatment by said abrasive surface;

means for moving workpieces across said worktable toward engagement with said abrasive surface;

an elevator mechanism for adjusting the vertical position of said worktable;

means for sensing the vertical position of an upper surface of a workpiece placed upon the worktable and approaching said abrasive surface; and control means responsive to said sensing means for actuating said elevator mechanism to adjust the vertical position of said worktable by an amount proportional to and in a direction opposite from the displacement of the upper surface of such workpiece from a predetermined elevation, said control means operating when the upper surface of a workpiece is below said predetermined elevation to raise said upper surface to said predetermined elevation and operating when the upper surface of the workpiece is above said predetermined elevation first to lower such upper surface to a position below said predetermined elevation and then to raise such upper surface to said predetermined elevation, said control means including time delay means for delaying the actuation of said elevator mechanism a sufficient period of time to permit said sensing means to adjust to such upper surface of such workpiece.

References Cited by the Examiner

UNITED STATES PATENTS 2,751,722   6/1956   Skilling _____ 51—165.09 X

ROBERT C. RIORDON, *Primary Examiner.*

L. S. SELMAN, *Assistant Examiner.*